April 8, 1969
P. C. JOHNSON ET AL
3,436,857
FISHING ROD STRUCTURE
Filed April 22, 1966
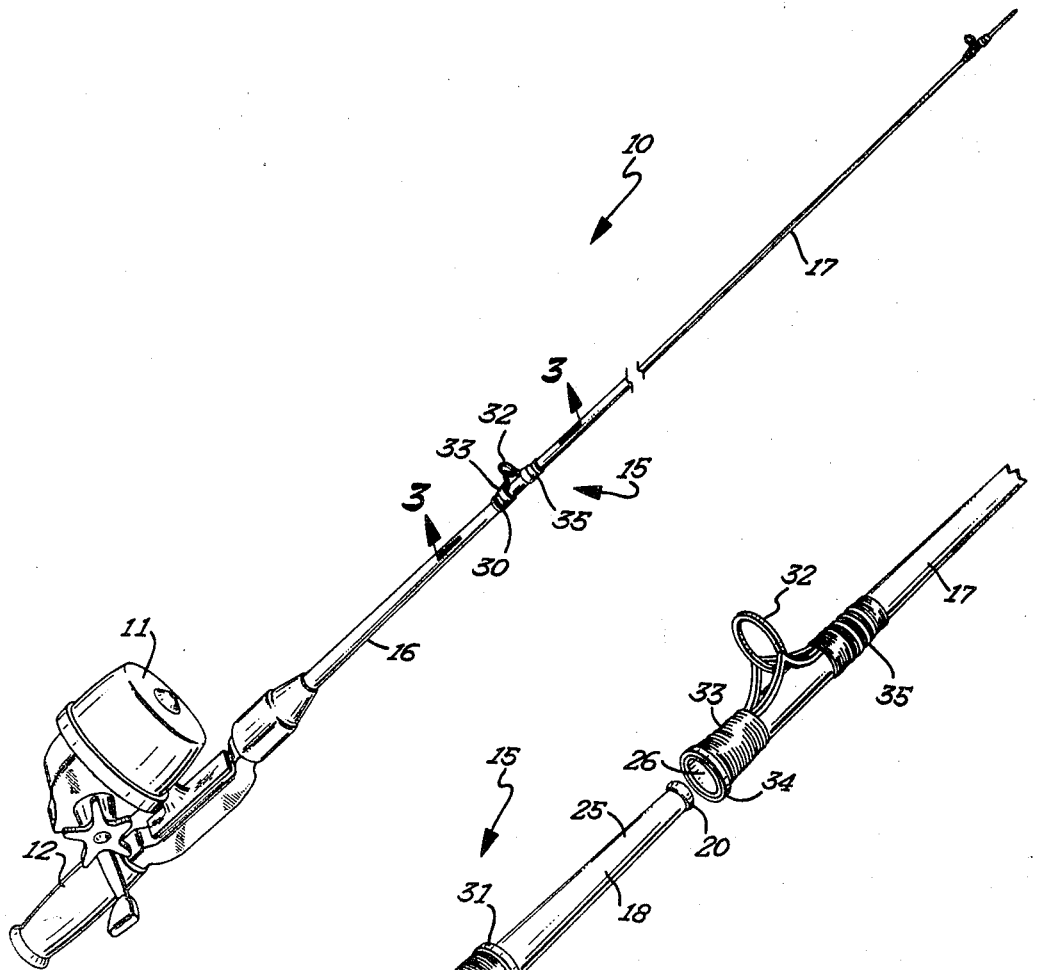
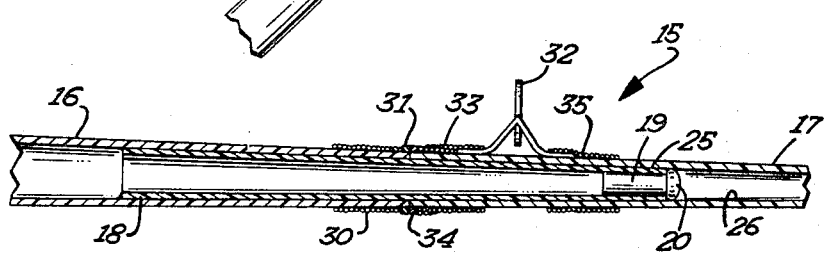
INVENTORS
PAUL C. JOHNSON
HARLAN B. CHRISTENSON
BY
Meyers & Peterson
ATTORNEYS 3,436,857
FISHING ROD STRUCTURE
Paul C. Johnson and Harlan B. Christenson, Spirit Lake, Iowa, assignors to Berkley & Company, Spirit Lake, Iowa, a corporation of Iowa
Filed Apr. 22, 1966, Ser. No. 544,470
Int. Cl. A01k 87/00, 87/02
U.S. Cl. 43—18     5 Claims

ABSTRACT OF THE DISCLOSURE

A fishing rod having a flexible shaft tapering continuously from the butt end to the tip end and comprising a plurality of individual segments coupled together by means of coupling ferrules. The individual ferrules are formed to have a prong portion extending from the forward end of the rod segment, the exterior contour and dimensions of the prong portion substantially matching the contour and dimensions of the inner wall of the segment receiving the prong portion, the flexural characterisitcs of the ferrule being substantially the same as those of the individual shaft segments. The tip of the prong portion has a resilient member secured thereto, the resilient member being generally soft and pliable, and having a transverse diameter which is slightly larger than the inner transverse diameter of the segment into which the prong is inserted at its final insertion depth so as to provide an interference fit with the inner wall of the mating segment.

---

The present invention relates generally to an improved flexible shaft, and more particularly to an improved flexible shaft adapted for use as a fishing rod, the shaft being formed by coupling together a plurality of segments by means of ferrules which have flexural characteristics substantially matching those flexural characteristics of the shaft segments. Fishing rods made in accordance with the present invention have the characteristic of a uniformly bending shaft element, which, when assembled, acts as a unitary continuous structure.

In the design of flexible shafts for various applications, particularly for use as fishing rods, it is frequently desirable to provide a shaft which is capable of acting as a "unit" free of any nodal points along the shaft during the normal vibration thereof. When a rod acts as a single unitary structure in this manner, the action of the rod is generally more predictable, the casting of a bait is accomplished with less effort, and the result is generally far more accurate. Thus, the fisherman may find his casting technique far more predictable than would be the case when using rods having discontinuities or nodal points introduced along the axial length of the shaft. In this connection, spurious modes of vibration may be established when these various nodal points are disposed along the length of the shaft, and this is responsible for lack of uniformity, consistency, and predictability in the effort of the user. In other words, it is generally desirable to utilize a rod shaft structure which will experience a minimum of localized structural abnormalities, and which will also respond in a predictable and desirable manner for the user. Uniformity in rod structure has been found to increase the output response which the rod provides to a given input of energy. Also, it has been learned that when a given rod is subjected to the playing action of a fish, the rod which functions in a predictable and uniform manner will enable the user to more easily and readily maintain a constant tension on the line without permitting slack to develop which will in turn permit the fish to disengage.

The provision of a rod having uniform tapering characteristics, both dimensionally and mechanically, can be readily achieved by utilizing a single shaft, preferably a hollow core shaft. Fishermen normally prefer to have a rod which can be disassembled when not in use, so as to facilitate more convenient handling and storage. Whenever a rod shaft is broken in this fashion, various anomalous characteristics develop which are in turn reflected by a rod action which is discontinuous or non-uniform. In addition, it is possible that localized fatigue will result from such discontinuities due to the presence of local areas of stress concentration in the shaft, particularly during use.

In accordance with the present invention a flexible shaft which is particularly adapted for use as a fishing rod is provided, this shaft being formed by coupling together a plurality of segments of a hollow core shaft by the use of ferrules having flexural characteristics substantially matching the flexural characteristics of the shaft segments. These ferrule elements are secured to the inner peripheral wall of the hollow core shaft at the tip-end of each of the segments, the ferrule extending as a male prong member beyond the tip-end of the rod segment. This ferrule is arranged to releasably retain the mating or adjoining segments together, and thus the outer periphery of the ferrule is adapted to be received along and adjacent the inner periphery of the trailing end of the next succeeding segment being joined. Care is taken so that the outer periphery of the male prong member substantially matches the inner periphery of the trailing end portion of the next adjacent segment, this generally requring that the prong member be frusto-conical in configuration. The prong further includes a resilient retaining means which is secured to the free end of the prong, this resilient retaining means having an outer dimension which provides a substantial interference fit with the inner periphery of the wall of the trailing end of the next adjacent segment at the final insertion depth. This resilient retaining means is preferably in the form of a rubber member having an exposed or head portion which has a diameter substantially in excess of the inner diameter of the trailing end of the next succeeding mating segment. It has been found that this arrangement provides a finished rod shaft of substantially uniform flexural characteristics from the butt end to the tip end thereof, and the ferrule means as herein described, provide a substantial locking action on the rod segments being joined.

Therefore, it is an object of the present invention to provide an improved internally disposed ferrule means for coupling two segments of a hollow core rod together, the ferrule providing a substantial match of the flexural characteristics of the rod shaft so as to provide a complete unit capable of acting as a single unitary structure.

It is yet a further object of the present invention to provide an improved means for coupling two segments of a hollow tapered flexible shaft together, the coupling means including a ferrule arranged to be secured to the inner periphery of one rod segment, and adapted to be received along the interior surface of the next succeeding rod segment of generally smaller diameter, the arrangement being such as to permit and promote the formation of a rod capable of being readily knocked-down, but yet which, when assembled, provides a rod of substantially uniform flexural characteristics from the butt-end to the tip-end thereof.

It is yet a further object of the present invention to provide an improved ferrule means for coupling together two segments of a tapered hollow core shaft, the ferrule including a resilient retaining means secured to the free end thereof and having an outer dimension which provides a substantial interference fit with the inner periphery of the wall of the adjacent mating segment at the final insertion depth.

Other and further objects of the present invention will become apparent to those skilled in the art upon a study of the following specification, appended claims, and accompanying drawings, wherein:

FIGURE 1 is a perspective view of a flexible shaft in the form of a fishing rod employing the coupling ferrule of the present invention, the shaft being shown with a portion of the body removed therefrom;

FIGURE 2 is a detailed view on a slightly enlarged scale, showing the structure of the coupling ferrule used in the shaft of the fishing rod of FIGURE 1; and FIGURE 3 is a sectional view taken along a plane through the axis of the shaft along the line and in the direction of the arrows 3—3 of FIGURE 1.

In accordance with the preferred modification of the present invention, and with particular reference to FIGURES 1–3 of the drawings, the flexible shaft in the form of the rod member generally designated 10 is provided at the butt-end with means for retaining the reel member 11 thereon adjacent the handle portion 12. Along the length of the rod 10, a ferrule member is available at 15 for joining the two rod segments together, this including a lower segment 16 and an upper segment 17. The ferrule 15 is shown in detail in FIGURE 2, this ferrule including a male prong member 18 which is coupled to the internal wall periphery of the lower segment 16, such as is shown in detail in the sectional view of FIGURE 3. The prong member 18 is provided with a resilient retaining means such as the rubber member inserted in the free-tip end thereof, as shown at 19, this retaining means including an integral head member or portion 20. This head member 20 has an outer diameter which generally exceeds the outer diameter of the ferrule portion 18, and is provided to make a substantial interference fit with the interior peripheral wall of the upper segment 17 of the rod member 10. In this connection, the contour of the ferrule member 18 is provided so as to substantially match the interior contour of the segments 16 and 17 at their point of juncture, the free-end or tip portion of the prong 18 being adapted to be received within the confines of the segment 17.

With particular reference to FIGURES 2 and 3, it will be seen that the prong member 18 has an outer peripheral surface as at 25. This outer surface 25 is generally frusto-conical in form, and is adapted to substantially match the inner contour 26 of the upper segment 17. At its ultimate insertion depth, the outer diameter of the prong member 18 substantially matches the inner diameter of the rod segment 17, the contours being substantially similar, one compared to another. This concept is shown in substantial detail in FIGURE 3. It will be observed that the individual ends of the segments 16 and 17 abut one another in final assembled form, as shown in detail in FIGURE 3.

The materials of construction for the shaft are preferably a plastic impregnated glass cloth. As is conventional in this art, the cloth is rolled upon a mandrel to the desired configuration, and thereafter cured in the conventional way. The glass cloth preferably has the majority of the filaments running in the axial direction of the shaft in order to provide for superior rod action. Glass cloth impregnated with various resins, such as phenolics or epoxies, with particular application to fishing rod structures are available commercially. The material of the prong member 18 is preferably the same as that of the rod shaft per se. This is generally the case since it is important to match the flexural characteristics of the prong member 18 with the flexural characteristics of the shaft segments 16 and 17; it being appreciated that other similar materials could be used provided the flexural characteristics substantially match to those flexural characteristics of the shaft segments 16 and 17. In one typical embodiment, the rod wall section with an outer diameter of 0.375 inch, had a wall thickness of about 0.035 inch. This area of the rod was provided with a ferrule tube having a wall thickness of about 0.030 inch, the outer diameter of the prong member substantially matching the inner diameter and configuration of the rod segment adjacent thereto. It has been found that a similar relationship of rod wall thickness to tube wall thickness is appropriate for generally matching the flexural characteristics of the tube to that of the wall. If a thicker wall is used in the ferrule prong member, it has been found that the rod will become more rigid than desired in that particular zone or region. If a ferrule construction of substantially lesser wall thickness is employed, the stability of the joint will generally be inadequate. In addition, for purposes of stability, it is desired that the prong member 18 have an axial length of about 2 inches in the sizes and configurations given above. The overall length of the rod will generally determine the number of ferrules which are required in order to provide the rod with the knock-down characteristics desired.

The rod segment 17 is provided with a thread winding 30 adjacent the tip end thereof, this being terminated in a winding check 31 at the free end thereof. The trailing end of the segment 17 has a winding area 33 together with an accompanying winding check 34 along the end thereof. The line guide 32 is held by means of the windings 33 at the trailing end thereof and by the cooperating windings 35 at the forward end thereof. While the various windings may be available and utilized at any portion along the rod, as indicated by the use to which the rod is to be put, it is generally desirable to locate a winding such as shown in FIGURES 2 and 3 along and adjacent the ferrule area. This enhances and assists the general, overall aesthetic appearance of the system.

It has been found that the tube-in-tube ferrule as shown in the present invention contributes to a substantial degree to the uniformity of rigidity and uniformity of structure of the overall assembled product. The resilient retaining means 19 is preferably of a pliable material such as soft silicone rubber or the like, the material having sufficient mechanical stability, rigidity, and nerve to withstand the rigors of use without unnecessarily abrading from the effects of the substantial number of insertion and withdrawal operations.

As indicated previously, the winding of a line guide is preferably disposed along and adjacent the ferrule area. In addition to the aesthetic considerations, it has been found that there is less contribution of instability to the entire system whenever a ferrule is disposed in the area of a line guide winding. The overall disruption of rod unity is therefore substantially nil, as compared with a rod having a solid tube configuration, without knock-down ferrule features included.

In certain instances it has been found preferable to contour the walls of the rod adjacent the ferrule area in order to provide a greater degree of stability and uniformity of flexural characteristics to the rod as complete. In this connection, the rod is generally milled in the area of the ferrule so as to provide a reduced wall thickness for the rod in the immediate area of the ferrule. Continuity in mechanical and flexural qualities from one end of the rod to the other are thereby preserved. In this connection, however, for rods of modest cross-sectional size, and modest wall thicknesses, it has not been found necessary to modify the rod structure in the area of the coupling ferrules. Thus, a unitary structure can be reasonably achieved by using an internal ferrule of this type having a wall thickness which is generally approaching, but preferably somewhat smaller than the wall thickness of the rod segments adjacent the ferrule. Generally speaking, continuity of mechanical and flexural characteristics can be achieved if the inner ferrule is between 10 percent and 20 percent less in wall thickness than the rod section immediately adjacent thereto. Of course, as indicated previously, the ferrule is preferably constructed of the same material as the rod structure, thus contributing to the uniformity of mechanical and flexural characteristics throughout the length of the finished rod.

A particularly valuable feature of this invention lies in the production of the rods, and the minimum number of operations added by virtue of inclusion of the features of the present invention. In this connection, a single rod shaft or blank is formed having the length desired for the finished product, and this rod shaft is then cut transversely to the axis thereof to form the mating segments. These segments are then fitted with the ferrule member in order to permit the rod to be assembled as a single unitary member with substantially uniform mechanical and flexural characteristics.

It will be appreciated that the examples provided herein are for purposes of illustration only, and are not to be otherwise construed as a limitation upon the scope to which this invention is otherwise entitled. Those skilled in the art may depart from these various specific embodiments without necessarily departing from the spirit and scope of the invention.

I claim:

1. A fishing rod comprising a thin-walled shaft being formed of a plurality of individual segments, the forward end of certain segments being adapted to be mated to the trailing end of the next adjacent forward segment, the segments being adapted to be retained together to form a single unitary structure of generally hollow core construction and having a gripping handle at the butt end thereof, the unitary structure tapering continuously from the butt end to the tip end of the composite structure with the forward and trailing ends of each pair of mating segments being joined together with the inner diameter, outer diameter, and wall thickness of the mated segments being arranged in substantial continuation along the shaft and adjacent the juncture points of the mating segments, said rod comprising:

(a) ferrule means arranged to releasably retain said mating segments together with the cross sectional surfaces of the walls of adjacent sections being in abutting relationship, one to another, said ferrule means comprising a hollow male coupling prong secured to the inner periphery of the forward end of one of said mating segments and adapted to be received within the hollow inner core of the trailing end of the next forwardly adjacent segment, said prong extending outwardly from said forward end and being generally tapered from said forward end along the axial extent thereof to a contour substantially matching the inner contour of the hollow inner core of the next forwardly adjacent segment along the juncture region, and resilient retaining means secured to said prong at the outer free tip end thereof and having an external diameter with a dimension providing a substantial interference fit with the hollow inner core of the next forwardly adjacent mating segment when at the final insertion depth.

2. The fishing rod as defined in claim 1 being particularly characterized in that the flexural characteristics of said prong are substantially the same as those of the mating segments.

3. The fishing rod as defined in claim 2 being particularly characterized in that said prong has a thin wall thickness dimension, and is generally of frusto-conical configuration.

4. The fishing rod as defined in claim 2 being particularly characterized in that the outer diameter of said mating segments is wrapped with a generally filamentary binding around the outer diameter thereof adjacent the ferrule region.

5. The fishing rod as defined in claim 2 being particularly characterized in that said resilient retaining means is generally soft, deformable, and pliable.

References Cited

UNITED STATES PATENTS

| 375,485 | 12/1887 | Godward | 231—3 |
| 741,219 | 10/1903 | Brandes | 231—3 |
| 2,018,923 | 10/1935 | Potter | 43—23 |
| 3,186,122 | 6/1965 | Clock et al. | 43—18 |

FOREIGN PATENTS

| 1,409,245 | 7/1965 | France. | |

WARNER H. CAMP, *Primary Examiner.*